United States Patent [19]

Hattori

[11] Patent Number: 4,871,343

[45] Date of Patent: Oct. 3, 1989

[54] BELT-AND-PULLEY TYPE CONTINUOUSLY VARIABLE TRANSMISSION

[75] Inventor: Torao Hattori, Saitama, Japan

[73] Assignee: Honda Giken Kogyo Kabushiki Kaisha, Tokyo, Japan

[21] Appl. No.: 187,858

[22] Filed: Apr. 29, 1988

[30] Foreign Application Priority Data

Apr. 30, 1987 [JP] Japan .................................. 62-107020
Jul. 9, 1987 [JP] Japan .................................. 62-171826

[51] Int. Cl.⁴ ............................................. F16H 11/02
[52] U.S. Cl. ........................................ 474/28; 74/867
[58] Field of Search .................... 474/11, 12, 17, 18, 474/28, 69, 70; 74/866–869

[56] References Cited

U.S. PATENT DOCUMENTS

| | | | |
|---|---|---|---|
| 3,600,961 | 8/1971 | Rattunde et al. | 74/867 |
| 4,519,790 | 5/1985 | Yamamuro et al. | 474/18 |
| 4,522,086 | 6/1985 | Haley | 474/28 |
| 4,533,340 | 8/1985 | Abo et al. | 474/28 |
| 4,560,369 | 12/1985 | Hattori | 474/28 |
| 4,619,157 | 10/1986 | Sakai | 74/867 X |
| 4,673,379 | 6/1987 | Ohzono et al. | 474/28 |
| 4,716,791 | 1/1988 | Ohzono et al. | 74/867 |
| 4,753,627 | 6/1988 | Kawamoto | 474/18 |

FOREIGN PATENT DOCUMENTS 55-65755 5/1980 Japan .
60-125450 7/1985 Japan .
60-136655 7/1985 Japan .
60-159456 8/1985 Japan .

Primary Examiner—Thuy M. Bui
Attorney, Agent, or Firm—Lyon & Lyon

[57] ABSTRACT

A belt-and-pulley continuously variable transmission comprises a driver pulley mounted on an input shaft and comprising a fixed conical member and a movable conical member, a driven pulley mounted on an output shaft and comprising a fixed conical member and a movable conical member, and a V-belt trained around the driver and driven pulleys. The movable conical members are axially movable to vary the effective diameters of the driver and driven pulleys for controlling the transmission ratio. The movable conical members are disposed on opposite sides of the V-belt. The transmission further includes a main servomechanism operatively coupled to the movable conical members for controlling axial movement of the movable conical members. As a feature of the servomechanism control, the transmission includes a first servomechanism for producing a prescribed amount of movement in a prescribed direction based on a prescribed signal, and a second servomechanism operatively connected to the first servomechanism and one of the driver and driven pulleys for applying the prescribed amount of movement produced by the first servomechanism to said one pulley.

11 Claims, 6 Drawing Sheets

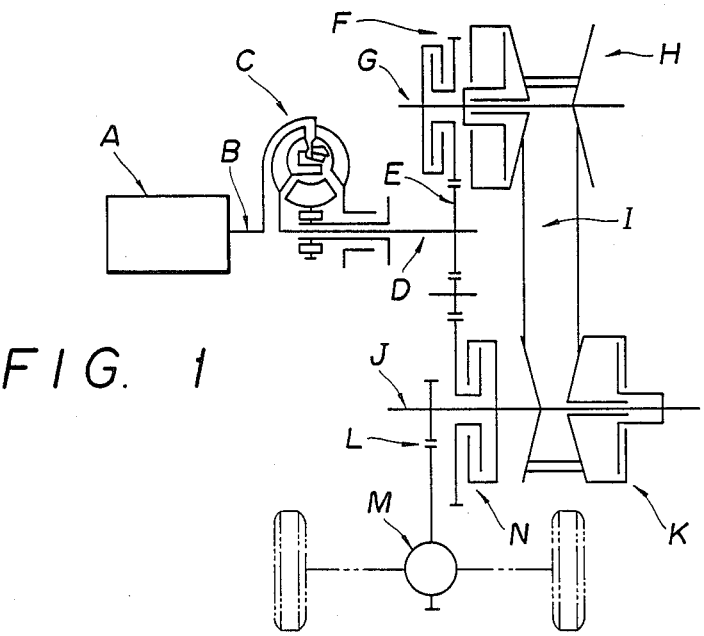
FIG. 1
FIG. 4A   FIG. 4B   FIG. 4C
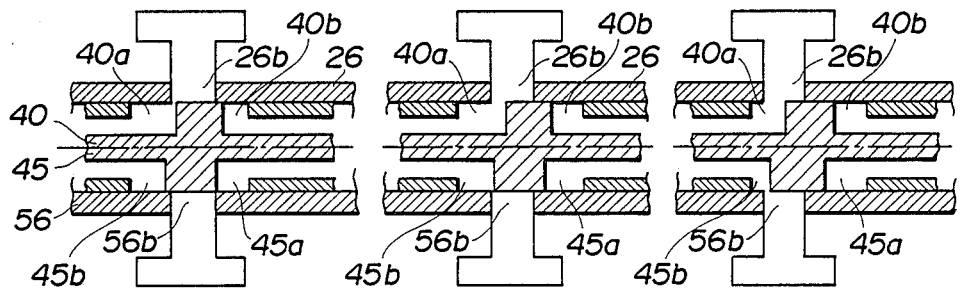
FIG. 4D   FIG. 4E
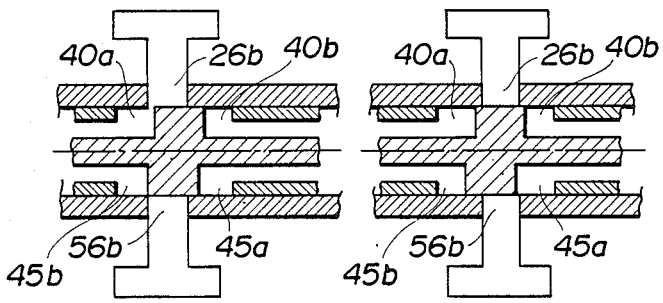

BELT-AND-PULLEY TYPE CONTINUOUSLY VARIABLE TRANSMISSION

BACKGROUND OF THE INVENTION

1. Field of the Invention

The present invention relates to a belt-and-pulley type continuously variable transmission, and more particularly to a belt-and-pulley type continuously variable transmission having a driver pulley on an input shaft, a driven pulley on an output shaft, each of the driver and driven pulleys comprising fixed and movable conical members, and a V-belt trained around the driver and driven pulleys, the movable conical members of the driver and driven pulleys being supplied with oil under pressure from a servo hydraulic pressure chamber for controlling the effective diameters of the pulleys thereby to continuously vary the transmission ratio between the input and output shafts, i.e., the driver and driven pulleys.

2. Description of the Relevant Art

Belt-and-pulley type continuously variable transmissions for use on motor vehicles are required to transmit the torque effectively by tensioning a V-belt trained around driver and driven pulleys to a degree proportional to the torque to be transmitted as by applying side fluid pressure to the V-belt. The V-belt should remain tensioned when the effective diameters of the driver and driven pulleys are to be varied in order to vary the transmission ratio.

Japanese Laid-Open Patent Publications Nos. 55-65755 (published May 17, 1980) and 60-125450 published July 4, 1985) disclose V-belt-and-pulley-type continuously variable transmissions in which the pressure of oil from a pump is regulated according to the rotational speed of a driver pulley (i.e., the rotational speed of an engine) and a transmission ratio, and the regulated oil pressure is supplied through a slide valve that is controlled by the rotational speed of the driver pulley and the opening of a throttle valve to a servo hydraulic pressure chamber which applies hydraulic pressure to axially move a movable conical member of the driver pulley in its axial direction, so that the effective diameter of the driver pulley can be controlled while keeping a side pressure imposed on the V-belt.

In the above conventional transmission, however, the effective area in the servo hydraulic pressure chamber for actuating the movable conical member of a driven pulley is smaller than that in the servo hydraulic pressure chamber for actuating the movable conical member of the driver pulley, and the hydraulic pressure chamber associated with the driven pulley is always supplied with regulated oil pressure. When the movable conical member of the driver pulley slides for varying the transmission ratio for a higher vehicle speed, the effective diameter of the driver pulley is increased so that the tension of the V-belt is increased to move the movable conical member of the driven pulley against the side pressure thereon for thereby reducing the effective diameter of the driven pulley. Therefore, the load on the V-belt is increased, affecting the durability of the V-belt. Conversely, in order to slide the movable conical member of the drive pulley in the direction of a larger speed ratio, the oil pressure in its servo hydraulic pressure chamber is released to decrease the tension of the V-belt so that the side force on the driven pulley is utilized to move its movable conical member against the tension of the V-belt for thereby increasing the effective diameter of the driven pulley. In this mode of operation, the side pressure on the driver pulley may unnecessarily be reduced.

U.S. Pat. No 3,600,961 issued Aug. 24, 1971 discloses a control structure utilizing higher-pressure oil of a constant pressure and regulated lower-pressure oil which can be regulated by a transmission ratio or the like, the lower-pressure being applied to impose a side pressure on driver and driven pulleys. When the transmission ratio is to be changed, the higher-pressure oil is selectively supplied to a servo hydraulic pressure chamber associated with the pulley which is of a greater effective diameter. The disclosed arrangement is also disadvantageous in that the load on a V-belt is increased to the extent which affects the durability thereof. In some transmission ratio range, a higher side pressure than the necessary side pressure has to be applied, resulting in a large pressure loss.

The two Japanese Laid-Open Patent Publications, referred to above, are also problematic in that when the servo hydraulic pressure chamber of the driver pulley is connected to a drain passage to lower the pressure in the chamber thereby to increase the transmission ratio, most of the oil is drained from the servo hydraulic pressure chamber and air is allowed to enter the servo hydraulic pressure chamber, whereupon the driver pulley fails to apply the desired side pressure on the belt. Moreover, when regulated oil pressure is thereafter introduced into the servo hydraulic pressure chamber of the drive pulley, air remaining therein is first compressed, and then the transmission ratio starts to be changed. As a result, the transmission does not operate with a good response, when the transmission ratio thereof is to be again decreased.

Japanese Laid-Open Patent Publication No. 60-159456 published Aug. 20, 1985 discloses a belt-and-pulley type continuously variable transmission having driver and driven pulleys associated with servo hydraulic pressure chambers which have different pressure-acting areas, respectively, the hydraulic pressure chamber of the driven pulley being supplied with regulated oil pressure at all times. When the hydraulic pressure in the hydraulic pressure chamber of the driver pulley is low, low-pressure oil is supplied thereinto to prevent oil from being drained. Therefore, the disclosed transmission is free from one of the drawbacks as described above. However, the transmission shown in this publication suffers from the following shortcomings:

1. Where the transmission is employed in a motor vehicle, mutually related signal oil pressures representing the opening of the throttle valve and the rotational speed of the engine act on the opposite ends of a slide valve, and the fixed port of a servo hydraulic pressure chamber is connected selectively to an oil pressure passage and an oil drain passage for varying the transmission ratio. In such an arrangement, however, there is a speed range in which an upshift and/or downshift cannot be performed, resulting in that. Accordingly, the transmission ratio cannot freely be controlled in some speed ranges.

2. The speed at which the transmission ratio varies tends to be constant at all times.

The above problems 1 and 2 can be solved by a belt-and-pulley type continuously variable transmission disclosed in Japanese Laid-Open Patent Publication No. 60-136655 published July 20, 1985. In this disclosed transmission, a regulated oil pressure is supplied to the hydraulic pressure chamber of a driver pulley through a directional control valve and a speed control valve which are disposed hydraulically in series with each other and controlled by solenoid-operated valves, respectively. The directional control valve disposed upstream of the speed control valve serves to change the direction in which the transmission ratio varies, and the downstream speed control valve serves to control the speed at which the transmission ratio varies. According to the disclosed transmission, the effective area of the movable conical member of a driven pulley is smaller than that of the movable conical member of the driver pulley, and the hydraulic pressure chamber of the driven pulley is supplied with the regulated oil pressure at all times. Therefore, the problem that the load acting on the V-belt increases when varying the transmission ratio cannot be solved by this transmission.

The present invention has been made in order to effectively solve the problems of the conventional belt-and-pulley continuously variable transmissions for use in motor vehicles.

SUMMARY OF THE INVENTION

It is an object of the present invention to provide a belt-and-pulley continuously variable transmission which is simple in structure, can keep side pressures of driver and driven pulleys at suitable levels corresponding to a torque to be transmitted, can freely control a transmission ratio in all speed ranges, and can control, to a certain extent, the speed at which the transmission ratio varies.

To achieve the above object, there is provided in accordance with the present invention a belt-and-pulley continuously variable transmission comprising an input shaft, a driver pulley mounted on the input shaft, an output shaft, a driven pulley mounted on the output shaft, a V-belt trained around the driver and driven pulleys, the driver pulley comprising a fixed conical member and a movable conical member, the driven pulley comprising a fixed conical member and a movable conical member, the movable conical member of the driver pulley and the movable conical member of the driven pulley being disposed on one side and the other side of the V-belt, respectively, and main servomechanism means operatively coupled to the movable conical members for controlling axial movement of the movable conical members on the input and output shafts to vary effective diameters of the driver and driven pulleys for controlling a transmission ratio.

There is also provided a belt-and-pulley continuously variable transmission comprising an input shaft, a driver pulley mounted on the input shaft and comprising a fixed conical member and a movable conical member, an output shaft, a driven pulley mounted on the output shaft and comprising a fixed conical member and a movable conical member, a V-belt trained around the driver and driven pulleys, first and second servo hydraulic pressure chambers for axially moving the movable conical members to vary effective diameters of the driver and driven pulleys for controlling a transmission ratio, a first servomechanism for producing a prescribed amount of movement in a prescribed direction based on a prescribed signal, a second servomechanism operatively connected to the first servomechanism and one of the driver and driven pulleys and responsive to the prescribed amount of movement of the first servomechanism for axially moving the movable conical member of said one pulley for the prescribed amount of movement in the prescribed direction, the second servomechanism comprising a bore defined in one of the input and output shafts on which said one pulley is mounted, a hollow slide valve fitted in the bore and connected to the movable conical member of said one pulley for movement in unison with the movable conical member of said one pulley, the hollow slide valve having a port therein communicating with the hydraulic pressure chamber of said one pulley, and a pilot valve slidably fitted in a bore defined in the slide valve and having an oil supply groove communicating with an oil pressure source and an oil drain groove communicating with an oil drain passage, and the pilot valve having one end connected to the first servomechanism.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a schematic view of a power transmission system for a motor vehicle, including a belt-and-pulley continuously variable transmission according to a first embodiment of the present invention;

FIGS. 4A through 4E are fragmentary schematic cross-sectional views showing successive positional relationships of control valves of respective pulleys of the transmission;

DETAILED DESCRIPTION OF THE PREFERRED EMBODIMENTS

Figure 2:
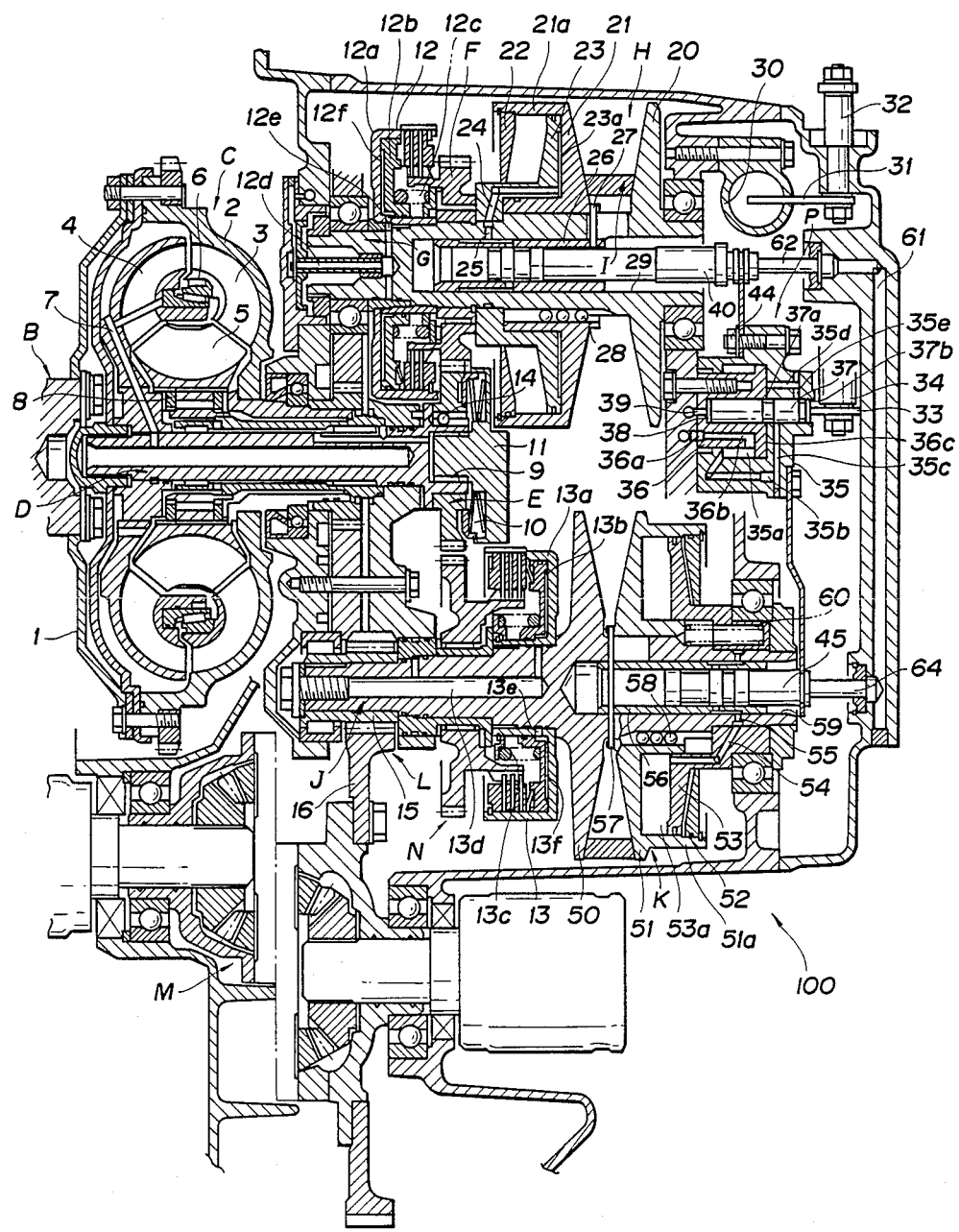
FIG. 2 is a cross-sectional view of the transmission shown in FIG. 1.

FIGS. 1 and 2 show a belt-and-pulley continuously variable transmission, generally designated by the reference numeral 100, according to a first embodiment of the present invention, the transmission 100 being shown as being mounted in a motor vehicle such as an automobile.

As shown in FIG. 1, the output torque from an engine A is transmitted from an engine output shaft B via a torque converter C and its output shaft D to the transmission 100. The transmission 100 has an input gear E held in mesh with a gear F which can selectively be connected to an input shaft G by a forward clutch 12 (described later). When the clutch 12 is engaged, the torque is transmitted to a driver pulley H and then through an endless V-belt I to a driven pulley K on an output shaft J. The torque is thereafter transmitted from the output shaft J to a pair of drive road wheels W through a speed reducer mechanism L and a differential mechanism M.

The input gear E is held in mesh with an idler gear at all times which in turn meshes with a reverse gear N that can selectively be connected to the output shaft J by a reverse clutch 13 (described later). When the motor vehicle moves in a reverse direction, the forward clutch 12 is disengaged and the reverse clutch 13 is engaged to reverse the drive road wheels W.

As illustrated in FIG. 2, the engine output shaft B is coupled to a torque converter cover 1 for rotating a support member 2 in unison which is coupled to the torque converter cover 1, the support member 2 supporting a pump impeller 3. A turbine impeller 4 is firmly coupled to the output shaft D of the torque converter C. The torque transmitted by the torque converter C is applied to the transmission 100 via the input gear E thereof which rotates with the output shaft D. The torque converter C has a stator 5 supported on the output shaft D by a one-way clutch 8, and a lockup clutch 6. The output shaft D has an axial recess 9 defined in its rear end and in which there is fitted by a bearing a cover 11 of a torque detector mechanism 10 that generates a transmitted torque signal for regulating a pressure of working oil.

The input gear E is always in mesh with a gear F rotatably supported on the input shaft G of the transmission 100. Rotation of the gear F is transmitted to the input shaft G when the forward clutch 12 is engaged. The forward clutch 12 comprises a multiple-plate clutch having a clutch housing 12a fixed to the input shaft G and a piston 12b defining a hydraulic pressure chamber 12f in the clutch housing 12a. Oil supplied under pressure from an oil passage 12d and a port 12e axially moves the piston 12b (to the right in FIG. 2) to press friction plates in the clutch housing 12a against friction plates mounted on the gear F, so that the torque from the gear F can be transmitted via the clutch housing 12a to the input shaft G. The friction plates on the gear F and the friction plates in the clutch housing 12a are alternately disposed, and are normally urged by a clutch spring 12c in a direction to disengage the clutch 12.

The driver pulley H is mounted on the input shaft G for rotation therewith. The driver pulley H comprises a fixed conical member 20 integrally formed with the input shaft G and a movable conical member 21 supported axially slidably, but nonrotatably, on the input shaft G. The endless V-belt I is trained around the driver pulley H and the driven pulley K on the output shaft J.

The movable conical member 21 has a cylinder wall 21a which cooperates with a partition 23 fixed to the input shaft G in defining a hydraulic pressure chamber 23a, the partition 23 having an oil passage 24 defined therein for supplying oil under pressure into and discharging oil under pressure from the hydraulic pressure chamber 23a. A cylinder cover 22 is attached to an end of the cylinder wall 21a. The input shaft G has a cylindrical bore 29 extending axially therethrough over a range in which the movable conical member 21 is slidable. In the bore 29, there are fitted slide valves 26, 40 for controlling the supply of oil under pressure to and the discharge of oil under pressure from the hydraulic pressure chamber 23a, and an oil pressure supply pipe 62. The movable conical member 21 can be axially moved smoothly by a ball bearing 28.

The speed reducer mechanism L includes a smaller-diameter gear 15 fixedly mounted on the output shaft J and held in mesh with a larger-diameter gear 16 of the differential mechanism M for transmitting the torque from the output shaft J to the differential mechanism M. The reverse gear N rotatably supported on the output shaft J is held in mesh with the input gear E at all times through the idler gear (not shown in FIG. 2). Rotation of the reverse gear N is selectively transmitted to the output shaft J by the reverse clutch 13. The reverse clutch 13 comprises a multiple-plate clutch having a clutch housing 13a mounted on the output shaft J, a piston 13b, a clutch spring 13c, and a hydraulic pressure chamber 13f. Oil under pressure can be supplied to the hydraulic pressure chamber 13f through an oil passage 13d defined axially in the output shaft J and a port 13e defined in the clutch housing 13a.

The driven pulley K is corotatably mounted on the output shaft J. The driven pulley K compress a fixed conical member 50 integrally formed with the output shaft J and a movable conical member 51 supported axially slidably, but nonrotatably, on the output shaft J. The movable conical member 51 has an integral cylinder wall 51a having an end to which a cylinder cover 52 is attached. The cylinder wall 51a cooperates with a partition 53 fixed to the output shaft J in defining a hydraulic pressure chamber 53a. Several springs 60 are disposed between the partition 53 and the movable conical member 51. The movable conical member 51 can be axially moved smoothly by a ball bearing 58.

The output shaft J has a cylindrical bore 59 extending axially therethrough over a range in which the movable conical member 51 is slidable. An oil pressure supply pipe 64 and slide valves 56, 45 are fitted in the bore 59. Oil under pressure from the slide valves 45, 56 is supplied to the hydraulic pressure chamber 53a through a port 55 and an oil passage 54 defined in the passage 53.

The movable conical members 21, 51 are disposed on one side and the other side of the belt I, respectively.

A structure for controlling the effective diameters of the driver and driven pulleys H, K in response to a transmission ratio varying signal based on the opening of a throttle valve and the pressure from a governor will be described below with reference to FIGS. 2 and 3.

Denoted at P is a servomechanism for producing a mechanical displacement serving as the transmission ratio varying signal. The servomechanism P comprises a servo piston 36 fixed to a transmission casing, a servo cylinder 35 slidably fitted over the servo piston 36, and a pilot valve 37 axially slidably disposed in bores coaxially defined in the piston 36 and the cylinder 35. The displacement of the pilot valve 37, i.e., the displacement of the servo cylinder 35 serves as the transmission ratio varying signal, as described later on.

The servo cylinder 35 and the piston 36 jointly define a hydraulic pressure chamber 36c therebetween. The servo cylinder 35 axially slides on the fixed piston 36 for a distance corresponding to the distance by which the pilot valve 37 moves. A connecting member 42 for moving the slide valve 40 of the driver pulley H is fixed to the servo cylinder 35 by means of a bolt 44, and a connecting member 47 for moving the slide valve 45 of the driven pulley K is fixed to the servo cylinder 35 by means of a bolt 49. The connecting members 42, 47 have portions 41a, 46, respectively, which are connected to the slide valves 40, 45, respectively. More specifically, the slide valve 40 has an internally threaded portion on its righthand end in which a cylindrical connecting member 41 is threaded, the cylindrical connecting member 41 having the portion 41a. The slide valve 40 and the connecting member 1 are positionally fixed to each other by a nut 41b after their relative position has been adjusted. The slide valve 45 has the portion 46. The slide valve 40 of the driver pulley H and the slide valve 45 of the driven pulley K are therefore axially movable in unison with the servo cylinder 35 of the servomechanism P.

The slide valves 26, 40, and 56, 45 fitted respectively in the axial bores 29, 59 of the input and output shafts G, J will now be described below.

The slide valves 26, 56, and 40, 45 comprise first slide valves 26, 56 coupled to respective pins 27, 57 axially slidable in unison with the movable conical members 21, 51, and second slide valves 40, 45 inserted in axial bores of the first slide valves 26, 56, respectively, and axially slidable in unison with the servo cylinder 35. The first slide valves 26, 56 have respective oil grooves 26a, 56a which are defined in outer peripheral surfaces thereof and are held in communication with oil ports 25, 55 leading to the hydraulic pressure chambers 23a, 53a at all times, and ports 26b, 56b which are defined radially inwardly of the oil grooves 26a, 56a and held in communication therewith.

The second slide valves 40, 45 have: respective oil grooves 40d, 45d which are supplied with oil under pressure from a regulated oil pressure passage 61 via oil supply pipes 62, 64 and ports 63, 65, respectively; ports 40c, 45c communicating with the oil grooves 40d, 45d, respectively, and oil supply grooves 40a, 45a which can be brought into communication with the ports 26b, 56b of the first slide valves 26, 56, respectively, on axial sliding movement of the second slide valves 40, 45 for supplying regulated oil pressure from the regulated oil pressure passage 61. The second slide valves 40, 45 also have an orifice 40e and a port 45e, respectively, and oil drain grooves 40b, 45b, respectively, which can be brought into communication with the ports 26b, 56b of the first slide valves 26, 56, respectively, on axial sliding movement of the second slide valves 40, 45 for connecting the hydraulic pressure chambers 23a, 53a to oil drain passages 43, 48, respectively, through the orifice 40e and the port 45e.

FIGS. 4A through 4E schematically illustrate the successive positional relationships between the ports 26b, 56b of the first slide valves 26, 56, the supply grooves 40a, 45a of the second slide valves 40, 45, and the drain grooves 40b, 45b of the second slide valves 40, 45.

Figure 3:
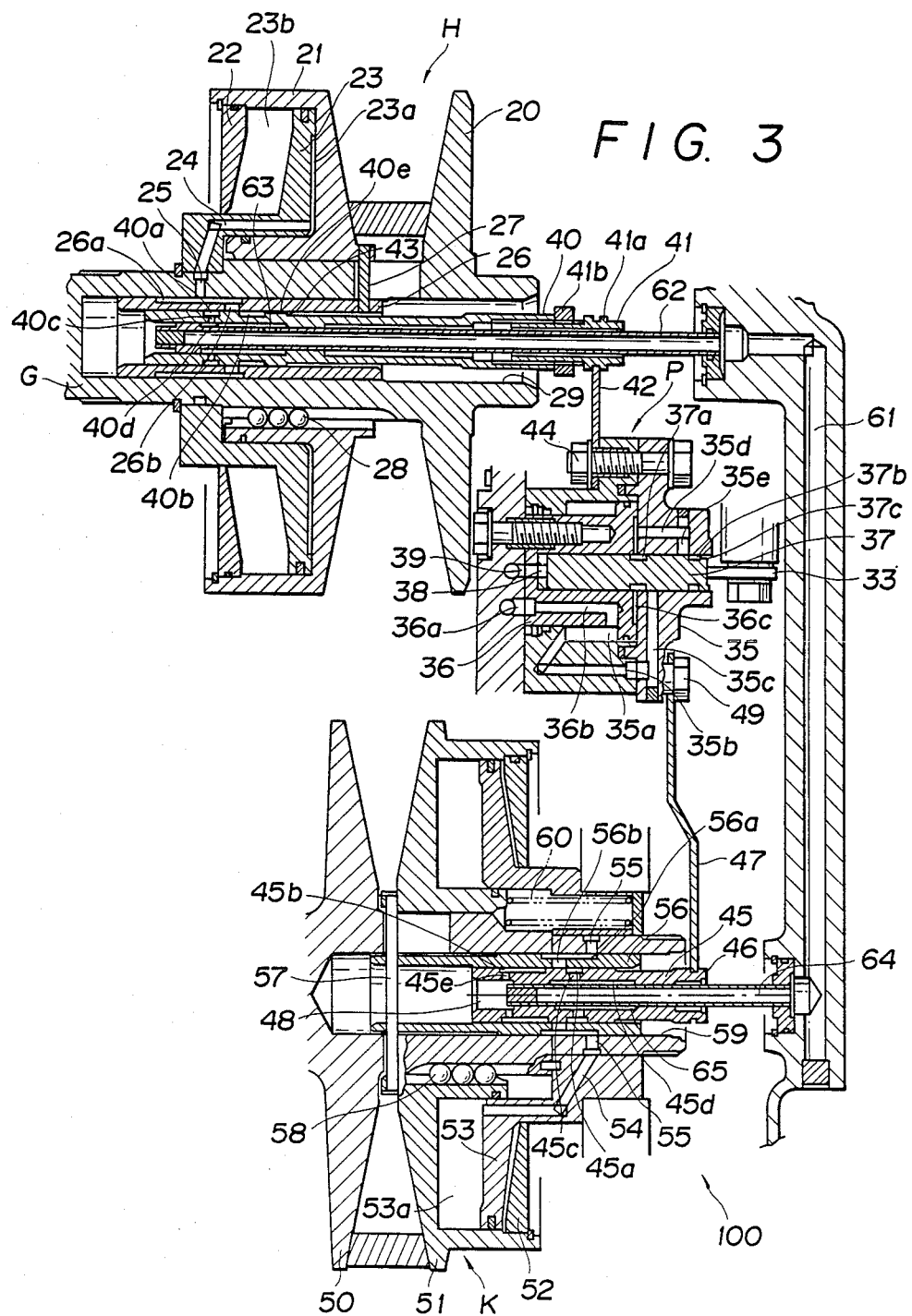
FIG. 3 is an enlarged fragmentary cross-sectional view of the transmission shown in FIG. 2.

FIGS. 4A through 4C show progressive movement to the right of the second slide valves 40, 45 from the position of FIG. 3 for a higher speed range in which the transmission ratio between the driver and driven pulleys H, K is smaller. First, as shown in FIG. 4A, the oil supply groove 40a in the driver pulley H starts to communicate with the port 26b for supplying oil under pressure to the hydraulic pressure chamber 23a through the port 25 and the oil passage 24. However, at this time, the oil drain groove 45b in the driven pulley K is not yet in communication with the port 56b. Therefore, the effective diameter of the driven pulley K is not reduced, and the movable conical member 21 does not move to the right.

Then, when the second slide valves 40, 45 are continuously moved rightwardly to the position of FIG. 4B, the oil drain groove 45b starts communicating with the port 56b to release the oil in the hydraulic pressure chamber 53a. The movable conical members 21, 51 now start to move to the right.

When the second slide valves 40, 45 are further moved to the right and stopped at the position of FIG. 4C, working oil is continuously drained from the hydraulic pressure chamber 53a. The movable conical members 21, 51 are moved to the right until the oil drain groove 45b and the port 56b are brought out of communication with each other, whereupon the movable conical members 21, 51 are stopped at the position of FIG. 4D. At this time, the belt I is tensioned while the port 26b remains in communication with the oil supply groove 40a.

Movement to the left of the second slide valves 40, 45 from the position of FIG. 3 for a lower speed range in which the transmission ratio between the driver and driven pulleys H, K is greater, will then be described below. First, as shown in FIG. 4E, the oil supply groove 45a starts communicating with the port 56b before the port 26b is brought into communication with the oil drain groove 40b. Thereafter, regulated oil pressure is supplied to the hydraulic pressure chamber 53a and oil pressure is drained from the hydraulic pressure chamber 23a in a manner which is a reversal of, or symmetric to, the process shown in FIGS. 4B through 4D. Therefore, the oil supply groove 45a first starts to communicate with the port 56b, and then the oil drain groove 40b starts to communicate with the port 26b, whereupon the movable conical members 21, 51 start to move to the left until finally they reach the positions corresponding to the positions of the second slide valves 40, 45.

Figure 5:
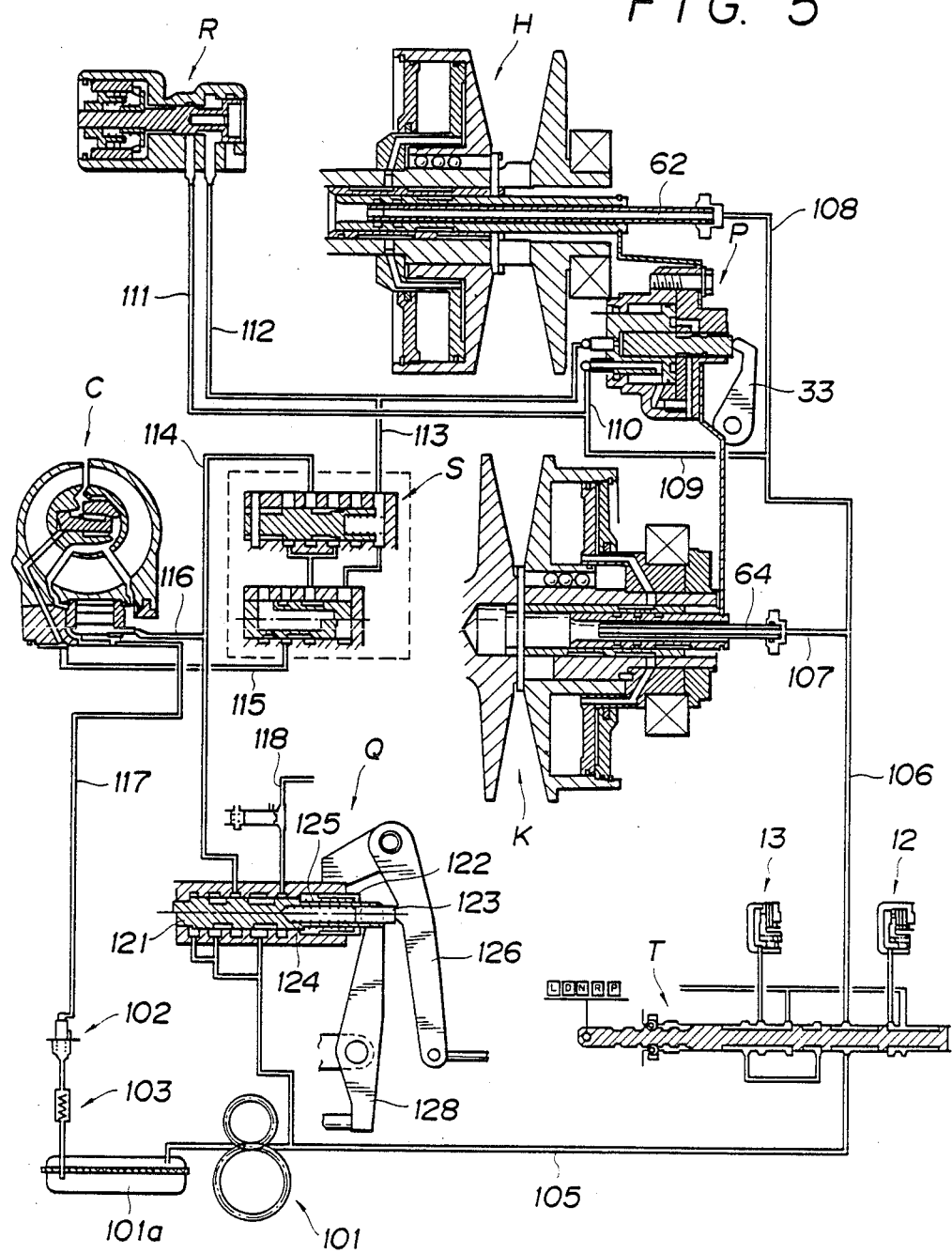
FIG. 5 is a circuit diagram of a hydraulic pressure circuit of the transmission.

FIG. 5 shows a hydraulic pressure circuit for controlling the transmission ratio of the transmission 100.

The pressure of working oil supplied from an oil reservoir 101a by a pump 101 is regulated by a pressure regulating valve Q. When a manually operated valve T is operated to slide into an L position as shown, the regulated oil pressure is applied via an oil passage 105 and the manually operated valve T to the forward clutch 12 to operate the same. As a result, the output torque of the torque converter C is transmitted to the input shaft G for thereby rotating the driver pulley H.

The pressure regulating valve Q regulates the pressure of working oil in order to produce an optimum side pressure on the belt dependent on the torque transmitted by the transmission 100. The pressure regulating valve Q includes a slide valve 121 for controlling the amount of oil drained into an oil drain passage 118. The slide valve 121 of the pressure regulating valve Q is normally urged to the left by a spring 124 and an insert 123 held against a lever 126 coupled to the servo cylinder 35 by means of a rod 127. The lever 121 operatively coupled to the servo cylinder 35 is movable in response to the transmission ratio of the transmission 100. The slide valve 121 is also urged to the left by a spring 125 and an insert 122 held against one end of a lever 128 which is movable in response to the input torque applied to the transmission 100. Therefore, the pressure of working oil is regulated by the pressure regulating valve Q to an oil pressure that is proportional to the input torque and the transmission ratio.

Figure 6:
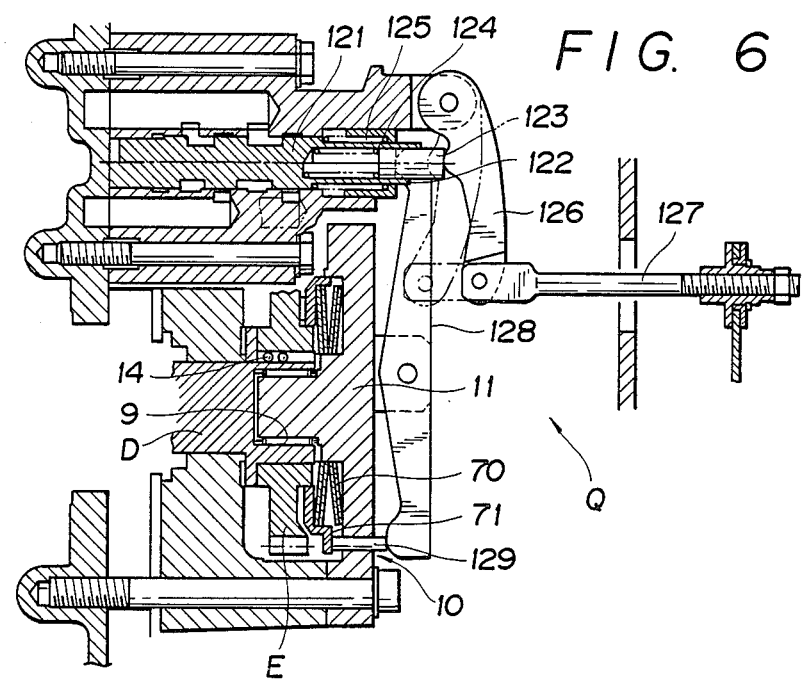
FIG. 6 is an enlarged cross-sectional view of a pressure regulating valve.

As illustrated in FIG. 6 in detail, the lever 128 is angularly moved in proportion to the input torque by the torque detecting mechanism 10. The input gear E is constructed as a helical gear axially movably supported on an end of the output shaft D of the torque converter C by means of a bearing 14. The gear E is displaced to the right in FIG. 6 by a thrust force commensurate with the input torque. Such a displacement of the gear E is transmitted to the other end of the lever 128 by a member 71 and a pin 129. A needle bearing is disposed between the gear E and the member 71, which is normally urged toward the gear E by means of a spring 70.

The pressure regulating valve Q is not limited to the illustrated structure, but may be of any structure insofar as it can generate an oil pressure dependent on the input torque transmitted to the transmission 100. For example, the pressure regulating valve may comprise a solenoid-operated valve for regulating the pressure of working oil in response to an electric torque signal produced by a known torque sensor or the like, or in response to an engine speed signal and a transmission ratio signal.

Referring back to FIG. 5, the regulated line oil pressure is applied to the oil pressure supply pipe 64 of the driven pulley K through oil passages 106, 107 and also to the oil pressure supply pipe 62 of the driver pulley H through an oil passage 108, at the same time that the regulated line oil pressure operates the forward clutch 12. The regulated oil pressure is also delivered into a branch passage 109 from which it is applied via an oil passage 110 to an oil pressure port 36a of the servomechanism P and also via an oil passage 111 to a governor valve R. The governor valve R comprises a valve for controlling an oil pressure under centrifugal forces, and is driven by the output shaft J for generating a governor oil pressure proportional to the vehicle speed. The governor oil pressure is introduced into an oil chamber 38 defined in an end of the pilot valve 37 of the servomechanism P, via an oil passage 112 and a port 39. The governor oil pressure is thus applied to the servomechanism P as a vehicle speed signal for speed ratio control.

The governor oil pressure is also supplied as a signal pressure via a branch passage 113 to a control valve S which controls the lockup clutch 6 of the torque converter C. An oil passage 114 extending from the pressure regulating valve Q supplies the regulated oil pressure to the torque converter C via a branch passage 116, and also supplies the regulated oil pressure to a hydraulic pressure chamber of the lockup clutch 6 through an oil passage 115 in response to operation of the control valve S. The torque converter C has a return oil passage 117 with a check valve 102 and an oil cooler 103 therein.

As described above, the oil chamber 38 in the end of the pilot valve 37 of the servomechanism P is supplied with the vehicle speed signal, i.e., the governor oil pressure. The other end of the pilot valve 37 is urged by a lever 33 under a force proportional to the opening degree of the engine throttle valve. A mechanism for detecting the opening degree of the engine throttle valve is fitted in a cylindrical support member 30 attached to the transmission casing.

When the forward clutch 12 is operated by the manually operated lever T, the torque from the torque converter C is transmitted to the driver pulley H, the driven pulley K, and the output shaft J for thereby starting the motor vehicle. In FIG. 3, the effective diameter of the driver pulley H is shown as minimum, the effective diameter of the driven pulley K is shown as maximum, and hence the transmission ratio is maximum (low speed range).

As the vehicle speed increases, the governor oil pressure applied to the oil chamber 38 in the end of the pilot valve 37 rises to move the pilot valve 37 to the right in FIG. 3. An oil pressure supply groove 37a in the pilot valve 37 is now connected to an oil passage 35c in the servo cylinder 35, whereupon the regulated oil pressure supplied to the oil pressure port 36a is supplied to the hydraulic pressure chamber 36c via an oil passage 36b defined in the fixed piston 36, a hydraulic pressure chamber 35a defined in the servo cylinder 35, an oil passage 35b defined in the servo cylinder 35, the oil passage 35c, and the oil pressure supply groove 37a. As a result, the servo cylinder 35 is moved to the right. When the vehicle speed stops increasing, the pilot valve 37 is stopped in position, and so is the servo cylinder 35 in a position corresponding to the pilot valve 37. When the vehicle speed continues to increase, thus moving the pilot valve 37 further to the right, the aforesaid port 36a, passage 36b, chamber 35a, and oil passages 35b, 35c remain in communication with the oil pressure supply groove 37a, so that the servo cylinder 35 keeps on moving to the right. Therefore, the servomechanism P has its servo cylinder 35 movable by following the pilot valve 37. The rightward movement of the servo cylinder 35 is transmitted by the connecting members 42, 47 to the second slide valves 40, 45 of the driver and driven pulleys H, K, respectively, to move the second slide valves 40, 45 to the right.

When the accelerator pedal is depressed to increase the opening degree of the throttle valve while the motor vehicle is running at a constant speed, the pilot valve 37 is moved to the left in FIG. 3 by the lever 33. Therefore, an oil drain groove 37b in the pilot valve 37, which communicates with an oil drain port 37c, is connected to a port 35e in the servo cylinder 35, and the oil pressure supply groove 37a is disconnected from the oil passage 35c, whereupon oil under pressure is drained from the hydraulic pressure chamber 36c through an oil passage 35d and the port 35e into the oil drain port 37c. The servo cylinder 35 is now moved to the left by a pressure buildup in the hydraulic pressure chamber 35a. The leftward movement of the servo cylinder 35 is transmitted by the connecting members 42, 47 to the second slide valves 40, 45 of the driver and driven pulleys H, K, respectively, to move the second slide valves 40, 45 to the left.

Operation of the slide valves 26, 40 and 56, 45 of the pulleys H, K shown in FIG. 3 will be described below.

When the servo cylinder 35 is moved to the right by an increase in the vehicle speed, the second slide valves 40, 45 of the driver and driven pulleys H, K are also moved to the right in unison with the servo cylinder 35. As described with reference to FIGS. 4A through 4E, the oil supply groove 40a of the second slide valve 40 of the driver pulley H first communicates with the port 26b of the first slide valve 26, supplying the regulated oil pressure into the hydraulic pressure chamber 23a of the driver pulley H. Immediately thereafter, the oil drain groove 45b, which communicates with the oil drain passage 48, of the second slide valve 45 of the driven pulley K communicates with the port 56b of the first slide valve 56, starting to drain oil under pressure from the hydraulic pressure chamber 53a. Therefore, the movable conical members 21, 51 now start to slide to the right.

Since the first slide valves 26, 56 move to the right integrally with the movable conical members 21, 51, respectively, the grooves and ports referred to above remain communicating with each other as long as the second slide valves 40, 45 continue to move. After the servo cylinder 35 is stopped due to a change in the throttle valve opening signal and/or the vehicle speed signal, the first slide valves 26, 56 slide to the right thereby to bring the grooves and ports out of communication, whereupon the rightward movement of the movable conical members 21, 51 is brought to an end.

The rightward movement of the movable conical members 21, 51 increases the effective diameter of the driver pulley H, and reduces the effective diameter of the driven pulley K, so that the transmission ratio is lowered (higher speed range).

When the opening degree of the throttle valve is increased while the transmission ratio is being minimum (high speed range), the pilot valve 37 is moved to the left, and so are the second slide valve 40 of the driver pulley H and the second slide valve 45 of the driven pulley K. As described above with reference to FIGS. 4A through 4E, the oil supply groove 45a of the second slide valve 45 of the driven pulley K first communicates with the port 56b of the first slide valve 56 to supply the regulated oil pressure into the hydraulic pressure chamber 53a in the driven pulley K. Immediately thereafter, the oil drain groove 40b of the second slide valve 40 of the driver pulley H communicates with the port 26b of the first slide valve 26 to start to drain the oil under pressure from the hydraulic pressure chamber 23a. As the oil starts being drained, the movable conical members 21, 51 also start to slide to the left. Since the first slide valves 26, 56 moves to the left in unison with the movable conical members 21, 51, the grooves and ports referred to above remain communicating with each other as long as the second slide valves 40, 45 continue to move. After the servo cylinder 35 is stopped by the throttle valve opening signal and/or the vehicle speed signal, the first slide valves 26, 56 slide to the left thereby to bring the grooves and ports out of communication, whereupon the leftward movement of the movable conical members 21, 51 is finished. The leftward movement of the movable conical members 21, 51 increases the effective diameter of the driven pulley K, and reduces the effective diameter of the driven pulley H, so that the transmission ratio is increased (lower speed range).

As described above, the movable conical members 21, 51 are movable by following the axial movement of the second slide valves 40, 45. In the driver pulley H, the slide valves 26, 40 jointly serve as a servomechanism with the second slide valve 40 functioning as a pilot valve of the servomechanism. Likewise, in the driven pulley K, the slide valves 56, 45 jointly serve as a servomechanism with the second slide valve 45 functioning as a pilot valve of the servomechanism.

As described above with reference to FIGS. 4A through 4E, the regulated oil pressure is first supplied to the hydraulic pressure chamber of the pulley which increases its effective diameter at the time, and immediately thereafter the working oil is drained from the hydraulic pressure chamber of the pulley which reduces its effective diameter. More specifically, when conditions for draining the oil from the hydraulic pressure chamber of the other pulley are established, conditions for supplying the regulated oil pressure to the pulley which increases its effective diameter have already been established. Therefore, the transmission ratio can be continuously be varied while maintaining the tension on the V-belt I. It would be more effective to restrict the oil drain groove 40b, the orifice 40e, the oil drain groove 45b, and the port 45e into smaller cross-sectional areas than those of the port 40c, the oil supply groove 40a, the port 45c, and the oil supply groove 45a.

In the belt-and-pulley continuously variable transmission 100, the movable conical members 21, 51 of the driver and driven pulleys H, K are axially slidable in unison with each other substantially in synchronism with each other by the servomechanism P which produces a signal for varying the transmission ratio and the slide valves 40, 26 and 45, 56 coacting with the servomechanism P. Consequently, no unnecessary side pressure is imposed on the V-belt I at either pulley, with the result that the effective diameters of the driver and driven pulleys can be increased and reduced while always maintaining the side pressure corresponding to the torque being transmitted.

Inasmuch as the servomechanism P which has its servo cylinder 35 movable by following the pilot valve 37 is employed as a mechanism for producing a signal for varying the transmission ratio, it can easily obtain an amount of movement which is equal to the amount by which the movable conical members 21, 51 are required to slide, and can produce a large operating force with a relatively small signal pressure or energy level.

Moreover, in the transmission 100, the movable conical members 21, 51 are movable by following the second slide valves 40, 45 serving as pilot valves. Therefore, when the oil is drained from the hydraulic pressure chamber 23a of the driver pulley H or the hydraulic pressure chamber 53a of the driven pulley K, the oil is drained from the chamber 23a or 53a by the amount which corresponds to the amount of movement of the movable conical member 21 or 51. Accordingly, the side pressure on the belt is prevented from being excessively reduced upon an unnecessary drop of the line oil pressure, and no air enters the hydraulic pressure chambers 23a, 53a. As a consequence, the movable conical member 21 or 51 can start sliding with good response when the transmission ratio is to be varied again. The transmission ratio can be increased or reduced no matter where the second slide valves 40, 45 shifted by predetermined signals may be positioned. Stated otherwise, the transmission 100 has no speed range in which an upshift and a downshift would be impossible to effect. These advantages can be provided by a simple valve structure. By appropriately selecting the effective areas of the ports 26b, 25, the orifice 45e, the ports 56b, 55, the oil drain groove 45b, and the like, the movable conical members 21, 51 of the driver and driven pulleys H, K are allowed to slide at a speed according to the speed at which the second slide valves 40, 45 slide. Thus, the speed at which the transmission ratio varies can variably be controlled.

The pressure of oil applied to the servo cylinder 35 of the servomechanism P may be higher than the pressure of oil applied to impress a side pressure on the pulleys, and the movable conical members 21, 51 may be moved mechanically by the servo cylinder 35.

The second slide valves 40, 45 may be actuated by a linear solenoid-operated valve that is slidable based on an electric signal, rather than by the pilot valve 37 which is slidable by a hydraulic pressure signal.

The movable conical members of the driver and driven pulleys may be mechanically coupled to each other so that they are slidable in unison with each other. In this case, the regulated oil pressure may be supplied to and drained from the hydraulic pressure chambers of the movable conical members by a solenoid-operated valve, such that the oil pressure is first supplied to the hydraulic pressure chamber of the pulley which is to increase its effective diameter, and then the oil is drained from the hydraulic pressure chamber of the pulley which is to reduce its effective diameter.

Moreover, the hydraulic pressure chamber which increases its effective diameter may intermittently be connected also to the oil pressure supply port for preventing a pressure drop in the hydraulic pressure chamber which otherwise might occur due to oil leakage via a seal of the chamber.

Figure 7:
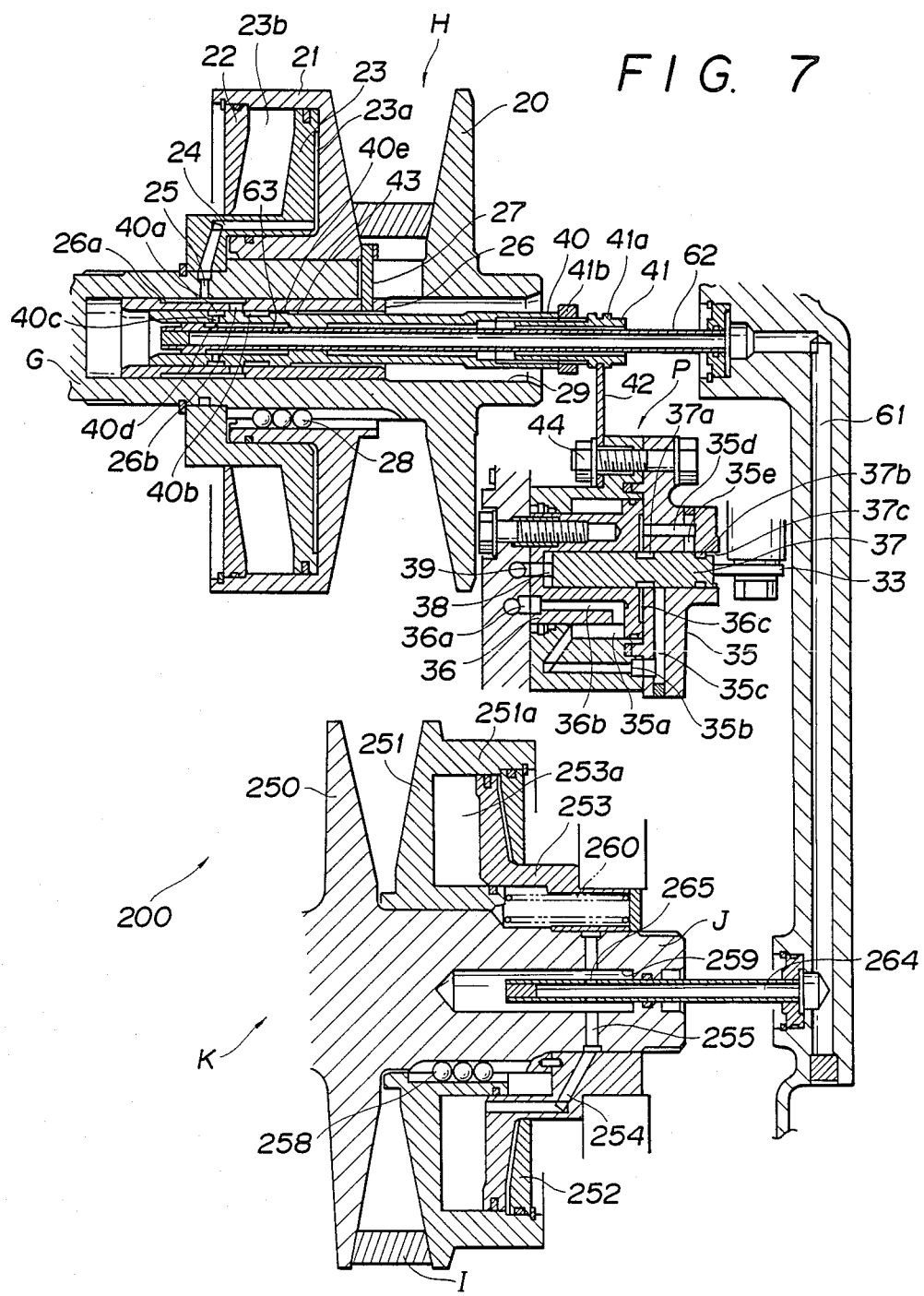
FIG. 7 is an enlarged fragmentary cross-sectional view of a belt-and-pulley continuously variable transmission according to a second embodiment of the present invention.

FIG. 7 fragmentarily shows a belt-and-pulley continuously variable transmission 200 according to a second embodiment of the present invention.

Those parts of FIG. 7 which are identical to those of the first embodiment are denoted by identical reference numerals or not denoted by any reference numerals, and will not be described in detail. Those components which are similar to those of the first embodiment are denoted by identical reference numerals plus 200.

The transmission 200 is different from the transmission 100 in that a servo cylinder 35 of a servomechanism P is not connected to a driven pulley K, and that the working area of a hydraulic pressure chamber 23a of the driver pulley H is set to be larger than the working area of a hydraulic pressure chamber 253a of the driven pulley K.

As shown in FIG. 7, the driver pulley H is mounted on an input shaft G of the transmission 200 for rotation therewith. The driver pulley H comprises a fixed conical member 20 integrally formed with the input shaft G and a movable conical member 21 supported axially slidably, but nonrotatably, on the input shaft G. An endless V-belt I is trained around the driver pulley H and the driven pulley J on the output shaft J.

The movable conical member 21 has a cylinder wall 21a which cooperates with a partition 23 fixed to the input shaft G in defining a hydraulic pressure chamber 23a, the partition 23 having an oil passage 24 defined herein for supplying oil under pressure into and discharging oil under pressure from the hydraulic pressure chamber 23a. A cylinder cover 22 is attached to an end of the cylinder wall 21a. The input shaft G has a cylindrical bore 29 extending axially therethrough over a range in which the movable conical member 21 is slidable. In the bore 29, there are fitted valves 26, 40 for controlling the supply of oil under pressure to and the discharge of oil under pressure from the hydraulic pressure chamber 23a, and an oil pressure supply pipe 62. The movable conical member 21 can be axially moved smoothly by a ball bearing 28.

The driven pulley K is corotatably mounted on the output shaft J. The driven pulley K comprises a fixed conical member 250 integrally formed with an output shaft J and a movable conical member 251 supported axially slidably, but nonrotatably, on the output shaft J. The movable conical member 251 has an integral cylinder wall 251a having an end to which a cylinder cover 252 is attached. The cylinder wall 251a cooperates with a partition 253 fixed to the output shaft J in defining a hydraulic pressure chamber 253a. Several springs 260 are disposed between the partition 253 and the movable conical member 251. The movable conical member 251 can be axially moved smoothly by a ball bearing 258.

The output shaft J has a cylindrical bore 259 extending axially therethrough over a range in which the movable conical member 251 is slidable. An oil pressure supply pipe 264 is inserted into the bore 259. Oil under pressure from the oil pressure supply pipe 264 is supplied at all times to the hydraulic pressure chamber 253a through a port 265 in the pipe 264, a port 255 in the output shaft J, and an oil passage 254 in the partition 253.

The working area of the hydraulic pressure chamber 23a of the driver pulley H is selected to be greater than the working area of the hydraulic pressure chamber 253a of the driven pulley K.

Denoted at P is a servomechanism for producing a mechanical displacement serving as the transmission ratio varying signal. The servomechanism P comprises a servo piston 36 fixed to a transmission casing, a servo cylinder 35 slidably fitted over the servo piston 36, and a pilot valve 37 axially slidably disposed in bores coaxially defined in the piston 36 and the cylinder 35. The axial displacement of the pilot valve 37, i.e., the displacement of the servo cylinder 35 serves as the transmission ratio varying signal, as described later on.

The servo cylinder 35 and the piston 36 jointly define a hydraulic pressure chamber 36c therebetween. The servo cylinder 35 axially slides on the fixed piston 36 for a distance corresponding to the distance by which the pilot valve 37 moves. A connecting member 42 for moving the pilot valve 40 of the driver pulley H is fixed to the servo cylinder 35 by means of a bolt 44. The connecting member 42 has a portion 41a which is connected to the pilot valve 40 at a portion 41a. More specifically, the pilot valve 40 has an internally threaded portion on its righthand end in which a cylindrical connecting member 41 is threaded, the cylindrical connecting member 41 having the portion 41a. The pilot valve 40 and the connecting member 41 are positionally fixed to each other by a nut 41b after their relative position has been adjusted. The pilot valve 40 of the driver pulley H is therefore axially movable in unison with the servo cylinder 35 of the servomechanism P.

The valves 26, 40 fitted in the axial bore 29 of the input shaft G will now be described below.

The valves 26, 40 comprise a hollow cylindrical slide valve 26 coupled to a pin 27 axially slidable in unison with the movable conical member 21, and a pilot valve 40 inserted in an axial bore of the slide valve 26 and axially slidable in unison with the servo cylinder 35. The slide valve 26 has an oil groove 26a which is defined in an outer peripheral surface thereof and is held in communication with an oil port 25 leading to the hydraulic pressure chamber 23a of the movable conical member 21, and a port 26b which is defined radially inwardly of the oil groove 26a and held in communication therewith.

The pilot valve 40 has an oil groove 40d which is supplied with oil under pressure from an oil pressure passage 61 via an oil supply pipe 62 and a port 63, a port 40c communicating with the oil groove 40d, and an oil supply groove 40a which can be brought into communication with the port 26b of the slide valve 26 on axial sliding movement of the pilot valve 40 for supplying regulated oil pressure from the oil pressure passage 61. The pilot valve 40 also has an orifice 40e and an oil drain groove 40b which can be brought into communication with the port 26b of the slide valve 26 on axial sliding movement of the pilot valve 40 for connecting the hydraulic pressure chamber 23a to an oil drain passage 43 through the orifice 40e.

An oil chamber 38 defined in one end of the pilot valve 37 of the servomechanism P is supplied with a vehicle speed signal, i.e., a governor pressure. The other end of the pilot valve 37 is urged by a lever under a force proportional to the opening degree of the engine throttle valve. A port 36a of the servomechanism P is supplied with the regulated oil pressure commensurate with the transmission ratio and the input torque applied. The pilot valve 37 is controlled by a vehicle speed signal, a throttle valve opening signal, and a transmission ratio signal.

In FIG. 7, the effective diameter of the driver pulley H is shown as minimum, the effective diameter of the driven pulley K is shown as maximum, and hence the transmission ratio is maximum (low speed range).

As the vehicle speed increases after the vehicle has started, the governor oil pressure applied to the oil chamber 38 in the end of the pilot valve 37 rises to move the pilot valve 37 to the right in FIG. 7. An oil pressure supply groove 37a in the pilot valve 37 is now connected to an oil passage 35c in the servo cylinder 35, whereupon the regulated oil pressure supplied to the oil pressure port 36a is supplied to the hydraulic pressure chamber 36c. As a result, the servo cylinder 35 is moved to the right. When the vehicle speed stops increasing, the pilot valve 37 is stopped in position, and so is the servo cylinder 35 in a position corresponding to the pilot valve 37. When the vehicle speed continues to increase, thus moving the pilot valve 37 further to the right, the aforesaid port 36a and oil passage 35c remain in communication with the oil pressure supply groove 37a, so that the servo cylinder 35 keeps on moving to the right. Therefore, the servomechanism P has its servo cylinder 35 movable by following the pilot valve 37. The rightward movement of the servo cylinder 35 is transmitted by the connecting member 42 to the pilot valve 40 of the driver pulley H to move the pilot valve 40 to the right.

When the accelerator pedal is depressed to increase the opening degree of the throttle valve while the motor vehicle is running at a constant speed, the pilot valve 37 is moved to the left in FIG. 7 by the lever 33. Therefore, an oil drain groove 37b in the pilot valve 37, which communicates with an oil drain port 37c, is connected to a port 35e in the servo cylinder 35, and the oil pressure supply groove 37a is disconnected from the oil passage 35c, whereupon oil under pressure is drained from the hydraulic pressure chamber 36c through an oil passage 35d and the port 35e into the oil drain port 37c. The servo cylinder 35 is now moved to the left by a pressure buildup in the hydraulic pressure chamber 35a. The leftward movement of the servo cylinder 35 is transmitted by the connecting member 42 to the pilot valve 40 to move the pilot valve 40 to the left.

Operation of the valves 26, 40 of the driver pulley H shown in FIG. 7 will be described below.

When the servo cylinder 35 is moved to the right by an increase in the vehicle speed, the pilot valve 40 is also moved to the right in unison with the servo cylinder 35. The oil supply groove 40a of the pilot valve 40 communicates with the port 26b of the slide valve 26, supplying the regulated oil pressure into the hydraulic pressure chamber 23a of the driver pulley H.

As described above, the working area of the hydraulic pressure chamber 23a of the driver pulley H is larger than the working area of the hydraulic pressure chamber 253a of the driven pulley K. Therefore, when the oil under pressure is supplied to the hydraulic pressure chamber 23a, the movable conical member 21 is moved to the right, increasing the effective diameter of the driver pulley H, against the hydraulic pressure in the hydraulic pressure chamber 253a of the driven pulley K which is transmitted via the belt I. At the same time, the movable conical member 251 of the driven pulley K is moved to the right under the tension of the belt I, reducing the effective diameter of the driven pulley K. As a result, the transmission ratio is reduced. Since the slide valve 26 slides in unison with the movable conical member 21, the line pressure supply groove 40a and the port 26b remain in communication with each other and the movable conical member 21 keeps on sliding to the right as long as the pilot valve 40 slides to the right.

Since the slide valve 26 moves to the right with the movable conical member 21, the groove and port referred to above remain communicating with each other during movement of the pilot valve 40. After the servo cylinder 35 is stopped and the pilot valve 40 is stopped due to a change in the throttle valve opening signal and/or the vehicle speed signal, the slide valve 26 slides to the right thereby to bring the groove and port out of communication, whereupon the rightward movement of the movable conical member 21 is brought to an end. Consequently, the movable conical member 251 of the driven pulley K is also stopped. The rightward movement of the movable conical members 21, 251 increases the effective diameter of the driver pulley H, and reduces the effective diameter of the driven pulley K, so that the transmission ratio is lowered (higher speed range).

When the opening degree of the throttle valve is increased while the transmission ratio is being minimum (high speed range) and the servo cylinder 35 is moved to the left, the pilot valve 40 is moved to the left in unison with the servo cylinder 35. Therefore, the oil drain groove 40b communicates with the port 26b of the slide valve 26 to start to drain the oil under pressure from the hydraulic pressure chamber 23a via the orifice 40e into the oil drain passage 43. Because the movable conical member 251 of the driven pulley K is always urged to the left by regulated oil pressure, when the side pressure on the driver pulley H is relieved, the movable conical member 251 of the driven pulley K is moved to the left. The movement of the movable conical member 251 is transmitted by the tension of the belt I to the movable conical member 21 of the driver pulley H, thus moving the movable conical member 21 to the left. As a result, the effective diameter of the driver pulley H is reduced, and the effective diameter of thedriven pulley K is increased, so that the transmission ratio is increased (lower speed range).

When the servo cylinder 35 stops its leftward sliding movement, the pilot valve 40 is also stopped. As the slide valve 26 is moved to the left with the movable conical member 21, the port 25 and the oil drain groove 40b are brought out of communication with each other in a suitable position. Thus, the movable conical member 21 does not move to the left any further. At this time, the pressure in the hydraulic pressure chamber 23a of the driver pulley H is higher than the pressure in the hydraulic pressure chamber 253a of the driven pulley K, and the movable conical members 21, 251 stop their leftward movement.

The movable conical member 21 is movable by following the axial movement of the pilot valve 40. The valves 26, 40 jointly serve as a servomechanism.

In the transmission 200, since the servomechanism P which has its servo cylinder 35 movable by following the pilot valve 37 is employed as a mechanism for producing a signal for varying the transmission ratio, it can easily obtain an output of displacement which is equal to an axial displacement by which the movable conical member 21 is required to slide, and can produce a large operating force with a relatively small signal pressure or energy level.

Moreover, the movable conical member 21 is movable by following the pilot valve 40. Therefore, when the oil is drained from the hydraulic pressure chamber 23a, the oil is drained from the chamber 23a by the amount which corresponds to the amount of movement of the movable conical member 21. Accordingly, the side pressure on the belt is prevented from being excessively reduced upon an unnecessary drop of the line oil pressure, and no air enters the hydraulic pressure chamber 23a. As a consequence, the movable conical member 21 can start sliding with good response when the transmission ratio is to be varied again. No air is also admitted into the hydraulic pressure chamber 253a since the oil is drained from the chamber 253a by the amount corresponding to the amount by which the movable conical member 251 moves.

The transmission ratio can be increased or reduced no matter where the pilot valve 40 shifted by predetermined signals may be positioned. Stated otherwise, the transmission 200 has no speed range in which an upshift and a downshift would be impossible to effect. These advantages can be provided by a simple valve structures. By appropriately selecting the effective areas of the ports 26b, 25, the orifice 45e, and the like, the movable conical member 21 of the driver pulley H is allowed to slide at a speed according to the speed at which the pilot valve 40 slides. Thus, the speed at which the transmission ratio varies can variably be controlled.

The mechanism for axially moving the pilot valve 40 is not limited to the hydraulic servomechanism P. Instead, for example, a pinion shaft may be rotated by a step motor which is energized in response to a pulse signal based on a vehicle speed signal, a throttle valve opening signal, and a transmission ratio signal, and the pilot valve 40 may be axially moved by a rack shaft meshing with the pinion shaft.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A belt-and-pulley type continuously variable transmission comprising:
    an input shaft;
    a driver pulley mounted on said input shaft;
    an output shaft;
    a driven pulley mounted on said output shaft;
    a V-belt trained around said driver and driven pulleys;
    said driver pulley comprising a fixed conical member and a movable conical member;
    said driven pulley comprising a fixed conical member and a movable conical member;
    said movable conical members of said driven pulley and said fixed conical member of said driven pulley being disposed on one side and the other side of said V-belt, respectively; and
    main servomechanism means operatively coupled to said movable conical members for controlling axial movement of said movable conical members on said input and output shafts to vary the effective diameters of said driver and driven pulleys for controlling a transmission ratio; wherein said main servomechanism means comprises:
    a servo piston and a servo cylinder which jointly define a servo hydraulic pressure chamber, one of said servo piston and said servo cylinder being fixed in position and the other being movable with respect to said one of the servo piston and the servo cylinder;
    a pilot valve slidably fitted in a bore coaxial with said servo piston and said servo cylinder;
    the other of the servo piston and the servo cylinder having an oil supply passageway held in communication with an oil pressure source at all times and an oil drain passageway held in communication with said servo hydraulic pressure chamber at all times; and
    said pilot valve having an oil pressure supply groove which is selectively communicable with said oil supply passage of the other of the servo piston and the servo cylinder for supplying oil pressure to said servo hydraulic pressure chamber, and an oil drain groove which is selectively communicable with said oil drain passageway for connecting said servo hydraulic pressure chamber to an oil reservoir.

2. A belt-and-pulley continuously variable transmission according to claim 1, further including a casing, wherein said servo piston of said main servomechanism means is fixed to said casing, said servo cylinder being axially slidably fitted over said servo piston, said main servomechanism means having first and second connecting members operatively connecting said servo cylinder to said movable conical members of said driver and driven pulleys, respectively, for moving said movable conical members.

3. A belt-and-pulley continuously variable transmission according to claim 2, wherein said main servomechanism means comprises first servomechanism means operatively interposed between said first connecting member and the movable conical member of said driver pulley for moving said movable conical member of the driver pulley by an amount corresponding to the amount of movement of said first connecting member, and second servomechanism means operatively interposed between said second connecting member and the movable conical member of said driven pulley for moving said movable conical member of the driven pulley by an amount corresponding to the amount of movement of said second connecting member.

4. A belt-and-pulley continuously variable transmission according to claim 1, mounted on a motor vehicle, wherein said main servomechanism means has a signal hydraulic pressure chamber defined in one end of said pilot valve and receptive of a signal oil pressure, said belt-and-pulley continuously variable transmission further including urging means for urging the other end of said pilot valve in response to a parameter of said motor vehicle or a parameter of the engine on said motor vehicle.

5. A belt-and-pulley continuously variable transmission according to claim 4, further including governor valve means for supplying an oil pressure corresponding to a speed of the motor vehicle to said signal hydraulic pressure chamber of said pilot valve, said urging means comprising a throttle valve opening detecting mechanism, and a member displaceable by said throttle valve opening detecting mechanism for pressing the other end of said pilot valve with an urging force corresponding to the opening degree of a throttle valve of the engine on the motor vehicle.

6. A belt-and-pulley continuously variable transmission according to claim 1, wherein said main servomechanism means comprises means for moving said movable conical members of said driver and driven pulleys substantially in synchronism with each other.

7. A belt-and-pulley continuously variable transmission comprising:
an input shaft;
a driver pulley mounted on said input shaft and comprising a fixed conical member and a movable conical member;
an output shaft;
a driven pulley mounted on said output shaft and comprising a fixed conical member and a movable conical member;
a V-belt trained around said driver and driven pulleys;
first and second servo hydraulic pressure chambers for axially moving said movable conical members to vary effective diameters of said driver and driven pulleys for controlling a transmission ratio;
a first servomechanism for producing a prescribed amount of movement in a prescribed direction based on a prescribed signal;
a second servomechanism operatively connected to said first servomechanism and one of said driver and driven pulleys and responsive to said prescribed amount of movement of said first servomechanism for axially moving said movable conical member of said one pulley for said prescribed amount of movement in said prescribed direction;
said second servomechanism comprising:
a bore defined in one of said input and output shafts on which said one pulley is mounted;
a hollow slide valve fitted in said bore and connected to the movable conical member of said one pulley for movement in unison with the movable conical member of said one pulley, said hollow slide valve having a port therein communicating with the hydraulic pressure chamber of said one pulley; and
a pilot valve slidably fitted in a bore defined in said slide valve and having an oil supply groove communicating with an oil pressure source and an oil drain groove communicating with an oil drain passage; and
said pilot valve having one end connected to said first servomechanism.

8. A belt-and-pulley continuously variable transmission according to claim 7, wherein said first servomechanism comprises:
a servo piston and a servo cylinder which jointly define a third hydraulic pressure chamber, one of said servo piston and said servo cylinder being fixed in position and the other being movable with respect to said one of the servo piston and the servo cylinder;
a second pilot valve slidably fitted in a bore coaxial with said servo piston and said servo cylinder;
the other of the servo piston and the servo cylinder having an oil supply passageway held in communication with said oil source at all times and an oil drain passageway held in communication with said third hydraulic pressure chamber at all times; and
said second pilot valve having an oil pressure supply groove which is selectively communicatable with said oil supply passageway of the other of the servo piston and the servo cylinder for supplying working oil pressure to said third hydraulic pressure chamber, and an oil drain groove which is selectively communicatable with said oil drain passageway for connecting said third hydraulic pressure chamber to an oil drain passage.

9. A belt-and-pulley continuously variable transmission according to claim 8, mounted on a motor vehicle, wherein said first servomechanism has a signal hydraulic pressure chamber defined in one end of said pilot valve and receptive of a signal oil pressure, said belt-and-pulley continuously variable transmission further including urging means for urging the other end of said pilot valve in response to a parameter of said motor vehicle or a parameter of the engine on said motor vehicle.

10. A belt-and-pulley continuously variable transmission according to claim 8, further including a casing, wherein said servo piston of said first servomechanism is fixed to said casing, said servo cylinder being axially slidably fitted over said servo piston, said first servomechanism having a connecting member connecting said servo cylinder to said pilot valve of said second servomechanism.

11. A belt-and-pulley continuously variable transmission according to claim 7, wherein said servo hydraulic pressure chamber of said one pulley has a working area greater than that of the servo hydraulic pressure chamber of the other pulley.

* * * * *